(12) United States Patent
Piry et al.

(10) Patent No.: US 8,271,730 B2
(45) Date of Patent: Sep. 18, 2012

(54) HANDLING OF WRITE ACCESS REQUESTS TO SHARED MEMORY IN A DATA PROCESSING APPARATUS

(75) Inventors: Frederic Claude Marie Piry, Cagnes-sur-Mer (FR); Philippe Jean-Pierre Raphalen, Valbonne (FR); Norbert Bernard Eugéne Lataille, Le Cannet (FR); Stuart David Biles, Little Thurlow (GB); Richard Roy Grisenthwaite, Cambridgeshire (GB)

(73) Assignee: ARM Limited, Cambridge (GB)

( * ) Notice: Subject to any disclaimer, the term of this patent is extended or adjusted under 35 U.S.C. 154(b) by 697 days.

(21) Appl. No.: 11/907,265

(22) Filed: Oct. 10, 2007

(65) Prior Publication Data

US 2008/0091884 A1    Apr. 17, 2008

(30) Foreign Application Priority Data

Oct. 17, 2006 (GB) .................................. 0620609.8

(51) Int. Cl.
*G06F 12/00* (2006.01)
(52) U.S. Cl. ......... 711/119; 711/141; 711/147; 711/170
(58) Field of Classification Search .................. 711/119, 711/141, 147, 170
See application file for complete search history.

(56) References Cited

U.S. PATENT DOCUMENTS

| | | |
|---|---|---|
| 5,717,898 A | 2/1998 | Kagan et al. |
| 5,797,026 A | 8/1998 | Rhodehamel et al. |
| 6,021,468 A | 2/2000 | Arimilli et al. |
| 6,526,481 B1 * | 2/2003 | Shen et al. ..................... 711/147 |
| 6,823,429 B1 * | 11/2004 | Olnowich ..................... 711/141 |
| 6,868,481 B1 | 3/2005 | Gaither et al. |
| 2002/0100020 A1 * | 7/2002 | Hunter et al. ................. 717/124 |
| 2007/0228490 A1 | 10/2007 | Kocon |

FOREIGN PATENT DOCUMENTS

| | | |
|---|---|---|
| EP | 0 889 403 | 7/1999 |
| JP | 2009-532879 | 10/2009 |

OTHER PUBLICATIONS

Chi et al.: "Improving Cache Performance by Selective Cache Bypass," System Sciences 1989 vol. I: Architecture Track, Proceedings of the Twenty-Second Annual Hawaii International Conference, Kailua-Kona, HI, USA, Jan. 3-6, 1989, pp. 277-285, published Mar. 1, 1989.

(Continued)

*Primary Examiner* — Matthew Bradley
(74) *Attorney, Agent, or Firm* — Nixon & Vanderhye P.C.

(57) ABSTRACT

A plurality of processing units for performing data processing operations require access to data in shared memory. Each has an associated cache storing a subset of the data for access by that processing unit. A cache coherency protocol ensures data accessed by each unit is up-to-date. Each unit issues a write access request when outputting a data value for storing in shared memory. When the write access request requires both the associated cache and the shared memory to be updated, a coherency operation is initiated within the cache coherency logic. The coherency operation is performed for all of the caches including the cache associated with the processing unit that issued the write access request in order to ensure that the data in those caches is kept coherent.

13 Claims, 6 Drawing Sheets

OTHER PUBLICATIONS

M. Tomasevic et al.: "A Survey of Hardware Solutions for Maintenance of Cache Coherency in Shared Memory Multiprocessors," System Sciences 1993, Proceeding of the Twenty-Sixth Hawaii International Conference, Wailea, HI, USA, Jan. 5-8, 1993, pp. 863-872, published May 1, 1993.

T. Midorikawa et al.: "SNAIL-2: A SSS-MIN Connected Multiprocessor with Cache Coherent Mechanism," Parallel Computing, vol. 31, pp. 1-15, Elsevier Publishing, Amsterdam, NL, published Mar. 2005.

European Search Report dated Jan. 18, 2007.

Notification of Transmittal of International Search Report and Written Opinion for International Application No. PCT/GB2007/003479 mailed Feb. 1, 2008.

Translation of Japanese official action, Jan. 13, 2012, in corresponding Application No. JP 2009-532879.

* cited by examiner

HANDLING OF WRITE ACCESS REQUESTS TO SHARED MEMORY IN A DATA PROCESSING APPARATUS

This application claims priority to United Kingdom Application No. 0620609.8 filed Oct. 17, 2006, the entire content of which is hereby incorporated herein by reference.

TECHNICAL FIELD

The present invention relates to the handling of write access requests to shared memory in a data processing apparatus.

BACKGROUND

It is known to provide multi-processing systems in which two or more processing units, for example processor cores, share access to shared memory. Such systems are typically used to gain higher performance by arranging the different processor cores to execute respective data processing operations in parallel. Known data processing systems which provide such multi-processing capabilities include IBM370 systems and SPARC multi-processing systems. These particular multi-processing systems are high performance systems where power efficiency and power consumption is of little concern and the main objective is maximum processing speed.

To further improve speed of access to data within such a multi-processing system, it is known to provide each of the processing units with its own local cache in which to store a subset of the data held in the shared memory. Whilst this can improve speed of access to data, it complicates the issue of data coherency. In particular, it will be appreciated that if a particular processor performs a write operation with regards to a data value held in its local cache, that data value will be updated locally within the cache, but may not necessarily also be updated at the same time in the shared memory. In particular, if the data value in question relates to a write back region of memory, then the updated data value in the cache will only be stored back to the shared memory when that data value is subsequently evicted from the cache.

Since the data may be shared with other processors, it is important to ensure that those processors will access the up-to-date data when seeking to access the associated address in shared memory. To ensure that this happens, it is known to employ a cache coherency protocol within the multi-processing system to ensure that if a particular processor updates a data value held in its local cache, that up-to-date data will be made available to any other processor subsequently requesting access to that data.

In accordance with a typical cache coherency protocol, certain accesses performed by a processor will require a coherency operation to be performed. The coherency operation will cause a notification to be sent to the other processors identifying the type of access taking place and the address being accessed. This will cause those other processors to perform certain actions defined by the cache coherency protocol, and may also in certain instances result in certain information being fed back from one or more of those processors to the processor initiating the access requiring the coherency operation. By such a technique, the coherency of the data held in the various local caches is maintained, ensuring that each processor accesses up-to-date data. One such cache coherency protocol is the "Modified, Exclusive, Shared, Invalid" (MESI) cache coherency protocol.

If a particular piece of data can be guaranteed to be exclusively used by only one of the processors, then when that processor accesses that data, a coherency operation will not be required. However, in a typical multi-processing system, much of the data will be shared amongst the processors, either because the data is generally classed as shared data, or because the multi-processing system allows for the migration of processes between processors, or indeed for a particular process to be run in parallel on multiple processors, with the result that even data that is specific to a particular process cannot be guaranteed to be exclusively used by a particular processor.

Whilst the use of a cache coherency protocol can be used to ensure that each processing unit accesses up-to-date data, there are still certain types of accesses which can be very complex to handle within a system having multiple processing units sharing memory. For example, if a region of the shared memory is specified as a write through region, and a write access request is made by a particular processing unit to that write through region of shared memory, then it is necessary for the memory to be updated at the same time as any update is performed in the cache associated with that processing unit originating the write access request. To perform such an update in a multi-processor system introduces a lot of hazards. To enable the correct behaviour to occur the cache control logic of the associated local cache requires additional logic which increases its complexity and/or the introduction of significant delays in accessing the cache, in order to ensure that the update to the cache and the shared memory occurs in an atomic way. The atomic operation must be performed in its entirety without any intervening read or write operations, so as to prevent any other read or write access to the same data location whilst the update operation is taking place.

As an example of the type of hazard that can arise when handling a write access request to a write through region of shared memory, consider the situation where a first write causes a hit in the cache, and is being processed by the cache coherency logic, and so remains pending inside the processor core. Whilst that processing is taking place, a second write is issued to a location contiguous with the first write. A standard way of dealing with the second write when the first one is still pending is to merge the two accesses when applicable. This is mostly done to save power (only one write will be made to the cache when the coherency logic has finished its work) and to increase performance (the merge of the two writes allows a single "slot" to be used for two memory accesses, hence freeing some resources for some subsequent memory accesses).

However, this merging should not be done if the target of these writes is some shareable memory region, as it could cause the first write to be issued twice by the coherency logic. When the first write has been processed, and the memory updated, the second one should still be processed by the coherency logic, to at least update the memory. Since the two writes have been merged together, the second coherency action (and the second memory update) will in fact consist of the merge of the two writes, and hence the first write will be repeated to the memory. This breaks any memory ordering model, and is hence prohibited.

To prevent this double write, a first approach consists in adding some logic (hence some complexity) to prevent such merges. The other possible approach to avoid this increase in complexity consists in preventing such merges happening, even in the standard cases, the impact being on performances and power consumption.

Given the additional complexity and hazards introduced by providing such coherent write through write accesses, many systems providing cache coherent capable processors are unlikely to wish to support such behaviour, and accordingly one option is to not allow write through write accesses to shared memory. However, even if such a position is taken, there are still other types of access that introduce similar hazards. In particular, a region of shared memory may be specified as non-cacheable by a particular processor, or by a particular process running on that processor, and write accesses may be performed in relation to that non-cacheable region. It may be assumed that for a non-cacheable write access, there is no need to perform any lookup in the cache. However, if a processor uses a non-cacheable memory region, this only means that the processor itself will not allocate into the cache any data pertaining to that non-cacheable region. However, other processors in the system, including closely coupled coprocessors also able to access the local cache, may have a different view of memory and in particular a region that is viewed as non-cacheable by one processor may not be viewed as non-cacheable by another processor. Further, different memory maps may be used by different processes executing within the same processor, and accordingly it is possible that the data the subject of a non-cacheable write access request may in fact reside within a cache.

As a result, when handling a non-cacheable write access to shared memory it will typically be necessary to perform a lookup in the cache, and as a result it can be seen that the behaviour that must be handled is very similar to the earlier-discussed coherent write through write access. Hence, even if the decision is taken not to support coherent write through write accesses to shared memory, it is still necessary to provide some capability to handle non-cacheable shared write accesses. However, introducing such capability is very expensive in terms of the additional complexity introduced and/or the additional access delays incurred, particularly if, as is often the case, the actual likelihood of a non-cacheable shared write access resulting in a hit in the cache is very low.

Accordingly, it would be desirable to provide a more cost effective solution for enabling the correct behaviour for write access requests of the type that require both the cache associated with the originating processing unit and the shared memory to be updated.

SUMMARY

Viewed from a first aspect, a data processing apparatus comprises a plurality of processing units operable to perform data processing operations requiring access to data in shared memory; each processing unit having a cache associated therewith operable to store a subset of said data for access by that processing unit; cache coherency logic employing a cache coherency protocol to ensure data accessed by each processing unit is up-to-date; each processing unit being operable to issue a write access request when outputting a data value for storing in said shared memory, when the write access request is of a type requiring both the associated cache and the shared memory to be updated, a coherency operation being initiated within the cache coherency logic; the cache coherency logic being operable to perform the coherency operation in respect of the caches associated with the plurality of processing units, including the cache associated with the processing unit issuing the write access request, in order to ensure that the data in those caches is kept coherent; and the cache coherency logic further being operable to issue an update request to said shared memory in respect of the data value the subject of the write access request.

The ability to efficiently handle write access requests of a type requiring both the associated cache and the shared memory to be updated is achieved through use of the cache coherency logic already provided to ensure that the data in caches associated with other processing units in the data processing apparatus are kept up-to-date. In particular, when an originating processing unit issues a write access request of a type that requires both the associated cache and the shared memory to be updated, a coherency operation is initiated in the coherency logic. In addition to the usual practice of the cache coherency logic performing a coherency operation in respect of the caches associated with the other processing units within the system, the cache coherency logic also performs the coherency operation in respect of the cache associated with the originating processing unit, as a result of which the data in all of those caches is made coherent. The cache coherency logic is also arranged to issue an update request to the shared memory in respect of the data value the subject of the write access request, thereby ensuring that the required update to shared memory takes place.

As a result of such an approach, the originating processing unit can treat the write access request as a write access request that does not require a cache lookup, and instead the cache coherency logic is arranged to perform a coherency operation, and in particular is arranged to include the cache associated with the originating processing unit when performing that coherency operation. This hence avoids the additional complexity and/or cache access penalties that would occur if the originating processing unit in combination with its associated cache where instead to try and achieve the required behaviour itself, by in effect performing the cache update and the memory update in an atomic manner. Instead, since the cache coherency logic will already by its nature be able to avoid occurrence of the possible hazards, it can decouple the cache update from the required shared memory update whilst still achieving the same behaviour that would have resulted from an atomic update instigated by the originating processing unit.

Accordingly, the technology described in this application provides a much more elegant and simple solution to the problem of handling write access requests to shared memory in situations where both the associated cache and the shared memory need to be updated, by allowing the processing unit to treat the write access request in a simple way, and calling on the inherent abilities of the cache coherency logic to achieve the required behaviour for such write accesses.

There are various types of write access requests which may require both the associated cache and the shared memory to be updated. In one embodiment, one type of such write access request is a non-cacheable write access request to the shared memory. Alternatively, or in addition, another type of write access request that can be supported through use of the above-described techniques is a write through write access request to the shared memory.

The coherency operation performed by the cache coherency logic can take a variety of forms. In one embodiment, when performing the cache coherency operation the cache coherency logic issues a coherency request signal to each of the caches associated with the plurality of processing units, the coherency request signal identifying an address associated with the data value the subject of the write access request. Accordingly, in such embodiments, all of the caches associated with the various processing units are subjected to coherency checks. However, in an alternative embodiment, when performing the coherency operation the cache coherency logic is operable to apply a filter operation to determine which caches to issue coherency requests to, and then to issue a coherency request signal to the determined caches, the coherency request signal identifying an address associated with the data value the subject of the write access request. In such embodiments, the cache coherency logic is provided with additional features that allow it to filter coherency requests, and in particular the filter operation will typically take account of some knowledge of the content of the various caches in order to decide which caches need to be subjected to a coherency check. Such an approach can produce a power saving, by avoiding unnecessary coherency checks being performed.

In accordance with example embodiments, when an originating processing unit issues a write access request of a type requiring both the associated cache and the shared memory to be updated, then there is no requirement for the processing unit to perform a lookup in the cache before causing the cache coherency logic to initiate the coherency operation. However, in some embodiments, the processing unit may still choose to perform the cache lookup for some other reason. However, in one particular embodiment, the coherency operation is initiated within the cache coherency logic without a cache lookup being performed in the cache associated with the originating processing unit.

The caches associated with each processing unit may take a variety of forms. In particular, certain of the processing units may share such a cache. However, in one embodiment, for each processing unit the cache associated therewith is a local cache associated solely with that processing unit. Such caches are typically referred to as level one caches.

In one embodiment, each of the caches is provided as a data cache used solely to store data values, and typically separate instruction caches will be provided for storing instructions to be executed by the associated processing units. However, in an alternative embodiment, the caches can be unified caches storing both instructions and data.

The shared memory can take a variety of forms, and accordingly in one embodiment may be a particular memory device whose entire address space is shared. However, in an alternative embodiment, the shared memory is a shared memory region of a memory, and typically such a memory will also have other regions which have different attributes associated therewith, and hence for example may be classified as non-shared. Often a memory system will consist of multiple memory devices, all of them being part of one or multiple memory regions or areas. For example a memory area located at address 0 and being 1024 words (1K word) wide may actually be provided in multiple memory devices, for example four memory devices M0 to M3. Instead of having M0 store data for locations 0 to 255, M1 store data for locations 256 to 511, etc., M0 could be arranged to store data for locations 0, 4, 8, 12, . . . , M1 could be arranged to store data for locations 1, 5, 9, 13, . . . , etc.

The processing units can take a variety of forms, but in one embodiment at least one of those processing units is a processor core. Whilst in one embodiment all of the processing units may be processor cores, in alternative embodiments one or more of the processing units may take the form of other devices, for example a digital signal processor (DSP), a hardware accelerator, etc.

The cache coherency protocol can take a variety of forms, but in one embodiment the cache coherency protocol is a snoop-based cache coherency protocol. In accordance with such a cache coherency protocol, each processing device in the system (a processing device being for example the individual processing units, or the individual processing units in combination with their associated caches) may be arranged to snoop the activities occurring on a shared bus and, dependent on the information obtained therefrom, to perform any required coherency actions. In such embodiments, the cache coherency logic will typically be considered to be formed by a number of discrete elements associated with each of the processing devices.

Viewed from a second aspect, ache coherency logic is provided for use in a data processing apparatus having a plurality of processing units for performing data processing operations requiring access to data in shared memory, each processing unit having a cache associated therewith for storing a subset of said data for access by that processing unit, the cache coherency logic employing a cache coherency protocol to ensure data accessed by each processing unit is up-to-date, each processing unit being operable to issue a write access request when outputting a data value for storing in said shared memory, when the write access request is of a type requiring both the associated cache and the shared memory to be updated, the cache coherency logic being operable to initiate a coherency operation; the cache coherency logic being operable to perform the coherency operation in respect of the caches associated with the plurality of processing units, including the cache associated with the processing unit issuing the write access request, in order to ensure that the data in those caches is kept coherent; and the cache coherency logic further being operable to issue an update request to said shared memory in respect of the data value the subject of the write access request.

Viewed from a third aspect, a method handles write access requests to shared memory in a data processing apparatus, the data processing apparatus comprising a plurality of processing units for performing data processing operations requiring access to data in said shared memory, each processing unit having a cache associated therewith for storing a subset of said data for access by that processing unit, the method comprising the steps of: issuing from a processing unit a write access request when outputting a data value for storing in said shared memory; when the write access request is of a type requiring both the associated cache and the shared memory to be updated, initiating a coherency operation within cache coherency logic, the cache coherency logic employing a cache coherency protocol to ensure data accessed by each processing unit is up-to-date; performing the coherency operation in respect of the caches associated with the plurality of processing units, including the cache associated with the processing unit issuing the write access request, in order to ensure that the data in those caches is kept coherent; and issuing an update request to said shared memory in respect of the data value the subject of the write access request.

Viewed from a fourth aspect, a data processing apparatus comprises a plurality of processing means for performing data processing operations requiring access to data in shared memory means; each processing means having cache means associated therewith for storing a subset of said data for access by that processing means; cache coherency means for employing a cache coherency protocol to ensure data accessed by each processing means is up-to-date; each processing means for issuing a write access request when outputting a data value for storing in said shared memory means, when the write access request is of a type requiring both the associated cache means and the shared memory means to be updated, a coherency operation being initiated within the cache coherency means; the cache coherency means for performing the coherency operation in respect of the cache means associated with the plurality of processing means, including the cache means associated with the processing means issuing the write access request, in order to ensure that the data in those cache means is kept coherent; and the cache coherency means further for issuing an update request to the shared memory means in respect of the data value the subject of the write access request.

DETAILED DESCRIPTION

Figure 1A:
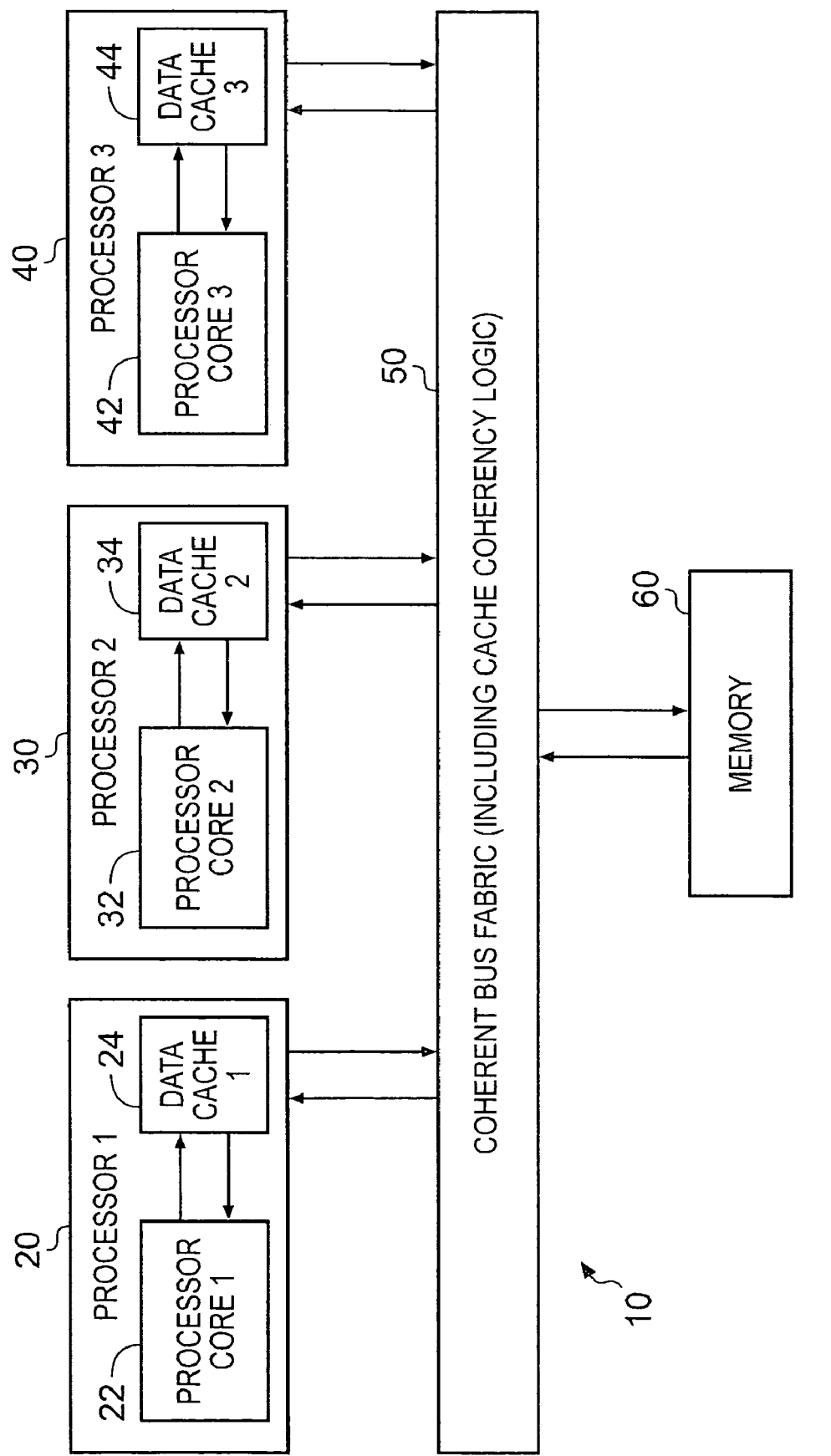
FIG. 1A is a block diagram of a data processing apparatus in accordance with a first example embodiment.

FIG. 1A is a block diagram of a data processing apparatus 10 comprising multiple processors 20, 30, 40 which are coupled via a coherent bus fabric 50 with a shared memory region 60. Each of the processor 20, 30, 40 comprises a processor core 22, 32, 42 coupled with an associated local cache 24, 34, 44, respectively, each cache being used to store a subset of the data held in the shared memory 60 in order to increase speed of access to that data by the associated processor. In one embodiment, each cache 24, 34, 44 is a data cache used to store data values used by the associated processor core 22, 32, 42, and typically a separate instruction cache will be provided (not shown in FIG. 1A) for caching the instructions required by the processor cores.

The coherent bus fabric 50 consists of a bus interconnect device along with cache coherency logic used to apply a cache coherency protocol in order to ensure that the data held in the various local caches 24, 34, 44 is kept up-to-date. In particular, the cache coherency logic will ensure that when one processor updates data in its local cache, any copies of that data in the caches associated with the other processors will either be appropriately updated or invalidated in those local caches to ensure coherency. In one embodiment, the cache coherency protocol used is the MESI cache coherency protocol, which will be described in more detail later with reference to FIG. 2.

The memory 60 may be entirely formed as shared memory, or alternatively may be viewed as consisting of a number of memory regions, with at least one of those regions being a shared memory region in which the processors 20, 30, 40 can store data that is shareable amongst those processors.

Figure 1B:
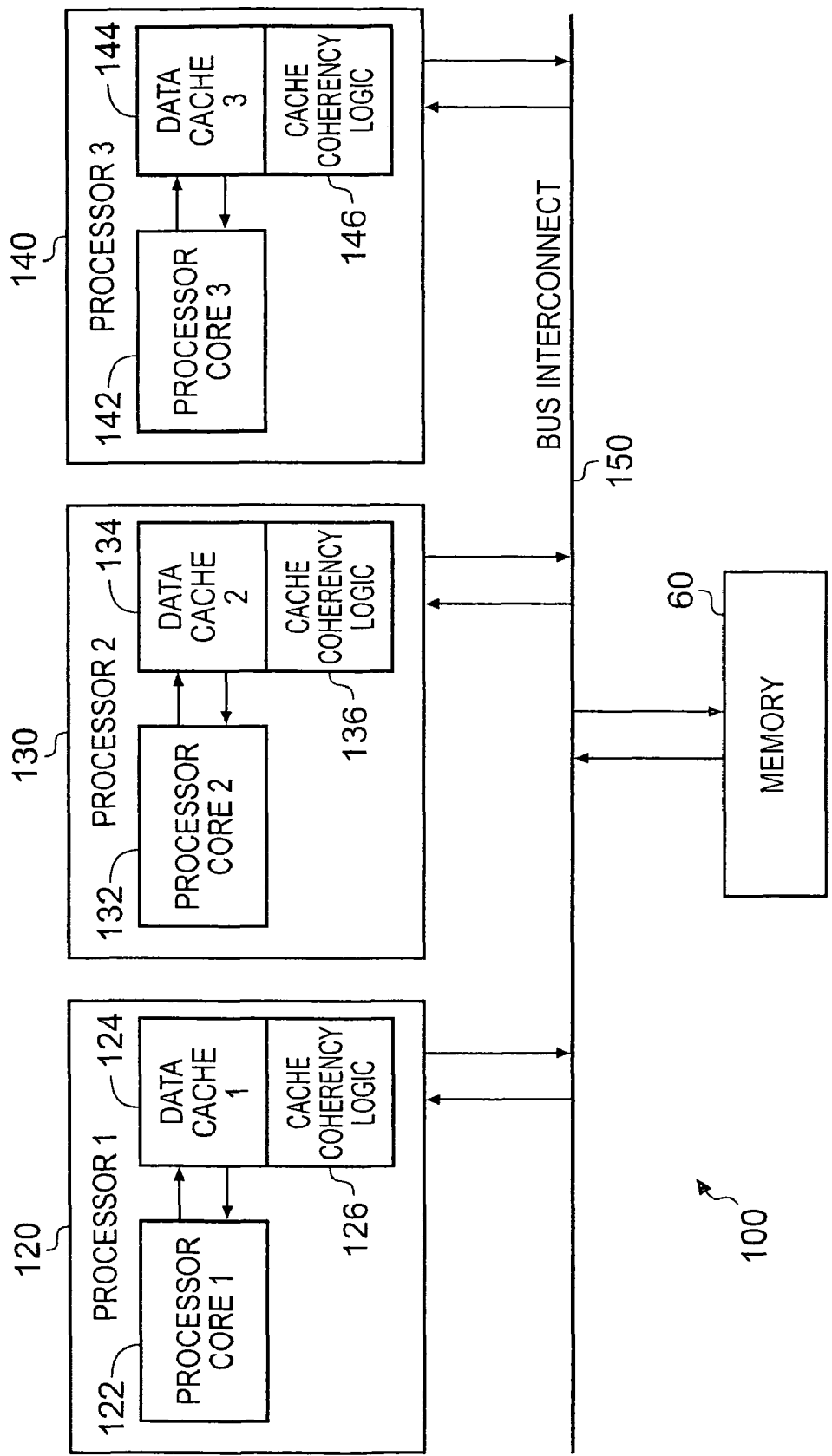
FIG. 1B is a block diagram of a data processing apparatus in accordance with a second example embodiment.

FIG. 1B is a block diagram of a data processing apparatus 100 in accordance with a second example embodiment. In accordance with this embodiment, the cache coherency logic is not formed as part of the coherent bus fabric, but instead separate cache coherency logic 126, 136, 146 is provided within each processor 120, 130, 140 and the individual processors are coupled via bus interconnect 150 with the memory 60. As before, each processor 120, 130, 140 includes a processor core 122, 132, 142 coupled to an associated local data cache 124, 134, 144.

In accordance with the embodiment of FIG. 1B, each cache coherency logic is arranged to snoop the activities of other processors as they appear on the bus interconnect 150 and based on the information received as a result of such snooping to determine whether any coherency operation is required in connection with the associated data cache in order to keep that data cache's contents coherent. Accordingly, by way of example, if processor core two 132 issues a write access request in connection with a data value stored in the data cache 134, resulting in the contents of the relevant cache line in that data cache being updated, the cache coherency logic 136 will issue a notification onto the bus interconnect 150 to identify that this update is taking place, and each of the cache coherency logic units 126, 146 in the other processors 120, 140 will observe this notification, and perform any required coherency operation in respect of the associated data caches 124, 144. This may in one embodiment involve invalidating the relevant cache line if the data is also stored in the associated data cache, or alternatively performing the required update. When such snooping operations are used to implement cache coherency, the data processing apparatus is often referred to as employing a snoop-based cache coherency protocol. As with the earlier described FIG. 1A, in one embodiment the actual cache coherency protocol employed is the MESI cache coherency protocol.

Figure 2:
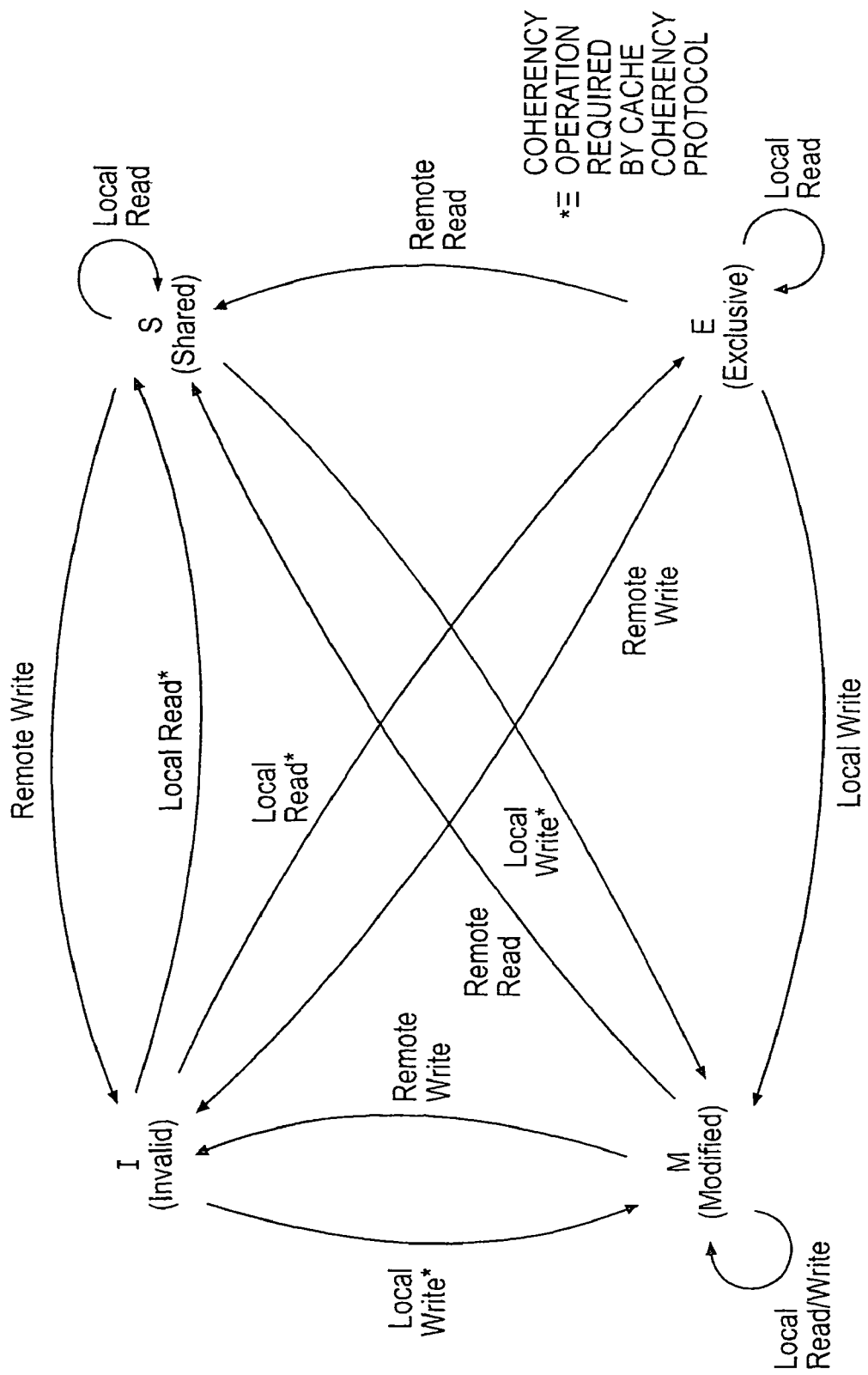
FIG. 2 is a diagram schematically illustrating a cache coherency protocol that may be employed within the data processing apparatus of FIGS. 1A and 1B.

FIG. 2 is a state transition diagram illustrating a particular type of cache coherency protocol called the MESI cache coherency protocol, and in one embodiment the MESI cache coherency protocol is used within the data processing apparatus 10, 100 of FIG. 1A or 1B. As shown in FIG. 2, each cache line of a cache can exist in one of four states, namely an I (invalid) state, an S (shared) state, an E (exclusive) state or an M (modified) state. The I state exists if the cache line is invalid, the S state exists if the cache line contains data also held in the caches of other processors, the E state exists if the cache line contains data not held in the caches of other processors, and the M state exists if the cache line contains modified data.

FIG. 2 shows the transitions in state that may occur as a result of various read or write operations. A local read or write operation is a read or write operation instigated by the processor in which the cache resides, whereas a remote read or write operation results from a read or write operation taking place on one of the other processors of the data processing apparatus and identified by a coherency request.

It should be noted from FIG. 2 that a number of read and write activities do not require any coherency operation to be performed, but there are a certain number of read and write activities which do require a coherency operation to be performed. In particular, if the processor in which the cache resides performs a local read operation resulting in a cache miss, this will result in a linefill process being performed to a particular cache line of the cache, and the state of the cache line will then change from having the I bit set to having either the S or the E bit set. In order to decide which of the S bit or E bit should be set, the processor needs to instigate a coherency operation to any other processors that may have locally cached data at the address in question and await the results of that coherency operation before selecting whether to set the S bit or the E bit. If none of the other processors that could have cached the data at the address in question have cached the data, then the E bit can be set, whereas otherwise the S bit should be set. It should be noted that if the E bit is set, and then another processor subsequently performs a local read to its cache in respect of data at the same address, this will be viewed as a remote read by the cache whose E bit had previously been set, and as shown in FIG. 2 will cause a transition to occur such that the E bit is cleared and the S bit is set.

As also shown in FIG. 2, a local write process will result in an update of a data value held in the cache line of the cache, and will accordingly cause the M bit to be set. If the setting of the M bit occurs as a transition from either a set I bit (in the event of a cache miss followed by a cache line allocate, and then the write operation) or a transition from the set S bit state, then again a coherency operation needs to be instigated by the processor. In this instance, the processor does not need to receive any feedback from the processors being subjected to the coherency operation, but those processors need to take any required action with respect to their own caches, where the write will be viewed as a remote write procedure. It should be noted that in the event of a local write in a cache line whose E bit is set, then the E bit can be cleared and the M bit set without instigating any coherency operation, since it is known that at the time the write was performed, the data at that address was not cached in the caches of any of the other processors.

Figure 3:
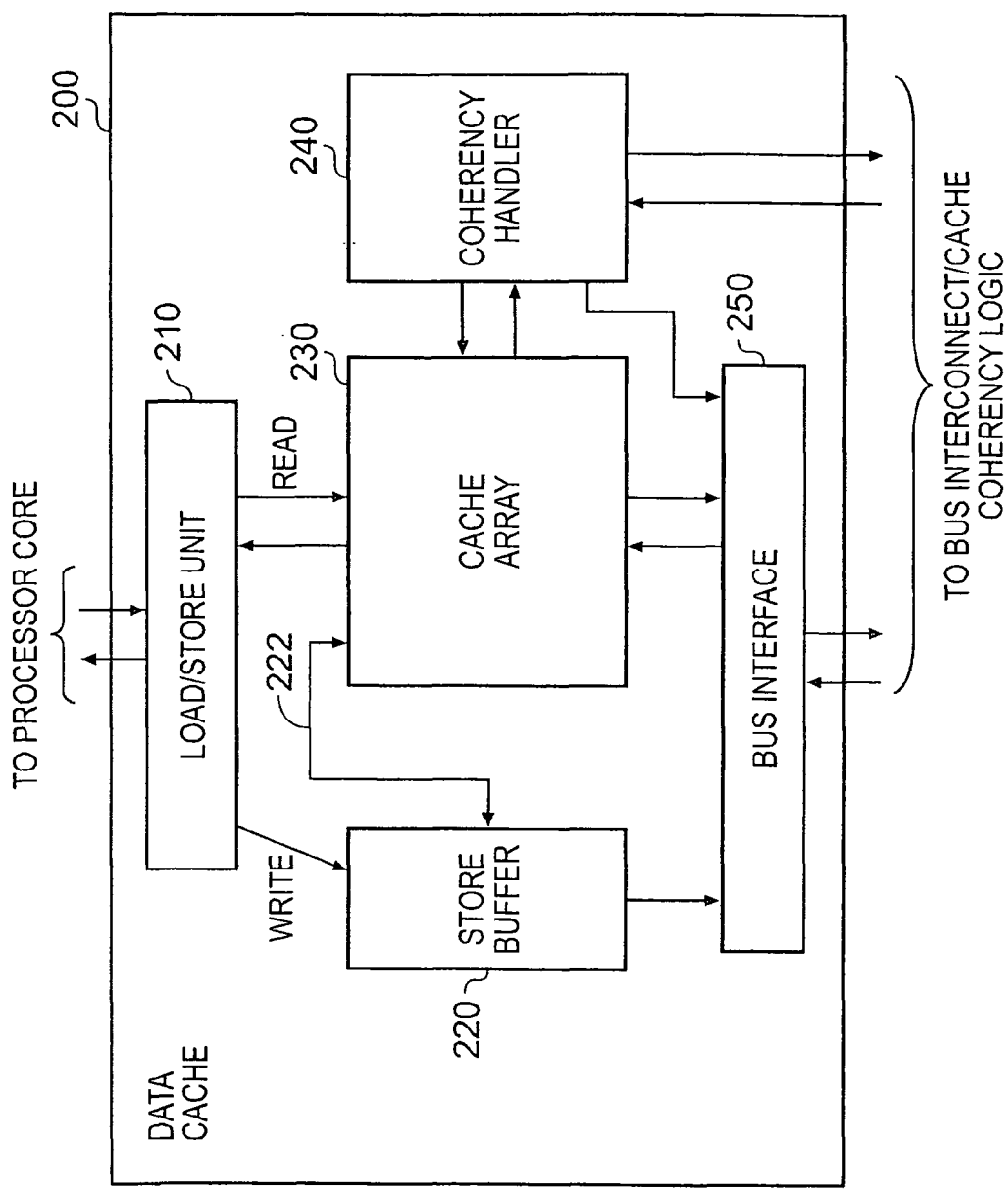
FIG. 3 is a block diagram illustrating in more detail the components provided within the data caches illustrated in FIGS. 1A and 1B in accordance with one example embodiment.

FIG. 3 is a block diagram illustrating the components provided within each data cache illustrated in FIGS. 1A and 1B in accordance with one example embodiment. The data cache 200 is coupled via a load/store unit (LSU) 210 with the associated processor core and is arranged to receive read and write access requests from that associated processor core. In the event of a read access request, that access request can be forwarded directly to the cache array 230 to enable a lookup procedure to be performed in order to determine whether the requested data value is in the cache array, if so that data value being routed back via the LSU 210 to the processor core. In the event of a cache miss, a linefill request is forwarded via the bus interface 250 to the bus interconnect logic to cause a cache line's worth of data including the data value of interest to be retrieved from the memory 60 for storing in the cache array 230, whereafter the required data value is returned via the LSU 210 to the processor core.

For write access requests, these are forwarded to the store buffer 220 from where they are then processed. In particular, for a cacheable access request, the store buffer may initiate a lookup via path 222 in the cache array 230 to determine whether the data value the subject of the write access request is within the cache array, and if so an update will be performed in the cache line of the cache array 230. In the event of a cache miss, a linefill process will be invoked by the store buffer 220 via the bus interface 250 to cause a cache line's worth of data to be retrieved from the memory for storing in the cache array, whereafter the write update can take place within the cache array. Alternatively the cache line's worth of data is received from the memory into a linefill buffer located within the bus interface 250, the write update is then merged with that data in the linefill buffer, and thereafter the line of data will be allocated in the cache array 230.

A coherency handler 240 is also provided for receiving coherency requests from the cache coherency logic and to then instigate the required coherency maintenance operation in respect of the relevant line in the cache array 230. Typically, a coherency request received from the cache coherency logic will identify the type of access instigating the coherency operation and the address of the data value the subject of the access request, in order to enable the coherency handler 240 to identify whether the relevant data value is stored within the cache array 230, and if so the appropriate action to take (as for example illustrated earlier with reference to FIG. 2 for the MESI protocol).

If as a result of the coherency maintenance operation, a cache line needs to be evicted from the cache array 230, the coherency handler 240 can communicate with the bus interface 250 in order to cause the required eviction to take place.

As discussed earlier, certain types of write access request require both the associated cache and the shared memory to be updated, examples of such access requests being non-cacheable write access requests and write through write access requests. If such access requests were to be handled correctly by the relevant processor, then this would significantly increase the complexity of the store buffer 220, since the store buffer would need to maintain its record for the data value the subject of the write access request whilst the update is taking place in shared memory 60, and to perform the update in the cache array 230 in synchronisation with the update in memory in order to ensure that the update occurs atomically in both the shared memory 60 and the cache array 230. Only after this atomic update has taken place can the store buffer discard that record and move on to processing another write request. Accordingly, not only is additional complexity involved, but also a significant performance impact can occur with regard to accessing the cache array 230. By providing further logic within the store buffer, it would be possible to only lock the relevant cache line in the cache array 230 whilst the update in memory is taking place (rather than the entire cache array 230), but this would be more complex than merely blocking all write access requests to the cache array whilst the update in memory is taking place.

However, in accordance with example embodiments, the store buffer 220 is arranged to treat any access request of the type requiring both the associated cache and the shared memory to be updated as an access not requiring any action in respect of the cache, and hence not requiring any lookup in the cache array 230 to determine whether there is in fact a hit or a miss. As a result, when the relevant write access request is processed by the store buffer, it is propagated from the store buffer 220 to the bus interface 250, as a result of which the access request is propagated on to the bus interconnect. The cache coherency logic also receives this request, and performs a coherency operation in respect of all of the caches 24, 34, 44, or 124, 134, 144. Importantly, it should be noted that this coherency operation is not only performed in respect of the data caches of the processors not involved in the instant write access request, but is also performed in relation to the data cache associated with the processor that has originated the write access request.

Accordingly, considering for example the embodiment of FIG. 1A, if the processor core 22 issues a write access request of a type that requires both the associated cache 24 and the shared memory 60 to be updated, the access request is propagated to the coherent bus fabric 50 without performing any lookup in the data cache 24, and instead the cache coherency logic performs a coherency operation in respect of each of the data caches 24, 34, 44. In one embodiment, such an operation involves issuing a coherency request to each of the data caches 24, 34, 44, with that coherency request being received by the coherency handler 240 within each such data cache. Thereafter, the required coherency maintenance operation is performed within each data cache.

In an alternative embodiment, the cache coherency logic includes additional filtering logic which enables it to determine for each data cache whether a coherency request needs to be issued to the coherency handler 240 of that data cache. Such a filtering operation may involve reference to some retained information about the contents of each data cache, in order to make a determination as to whether there is any need to perform a cache maintenance operation. By such an approach, it may be possible to remove the need for a significant number of coherency requests, and hence significantly reduce the amount of coherency maintenance operations that need to be performed by the coherency handler 240 within each data cache, thereby producing significant power savings.

The coherency maintenance operation performed by the coherency handler 240 can take a variety of forms. In one embodiment the coherency handler 240 may be arranged in such circumstances to detect whether there is a hit in the cache array, and if so to invalidate the relevant cache line, taking any necessary actions appropriate when invalidating that cache line. Alternatively, the coherency handler may be arranged to actually update the cache line with the new data value in the event that the cache array produces a hit, and if necessary to update the relevant coherency state bit associated with that cache line.

By such an approach, no additional logic needs to be provided within the store buffer 220 of the data caches, since the store buffer merely handles the write access request as though no cache access is required, and hence is not required to perform any atomic operation. Instead, the cache coherency logic will handle coherency within the relevant data caches, including the data cache associated with the originating processor core, and will additionally perform the required update to memory. Given that the cache coherency logic by its nature is able to detect and prevent any hazards that could occur whilst the memory update is taking place, there is no need for the data cache update and the memory update to occur atomically. Indeed, in one embodiment any hit in the data cache merely results in the invalidation of the relevant cache line in any case.

Figure 4:
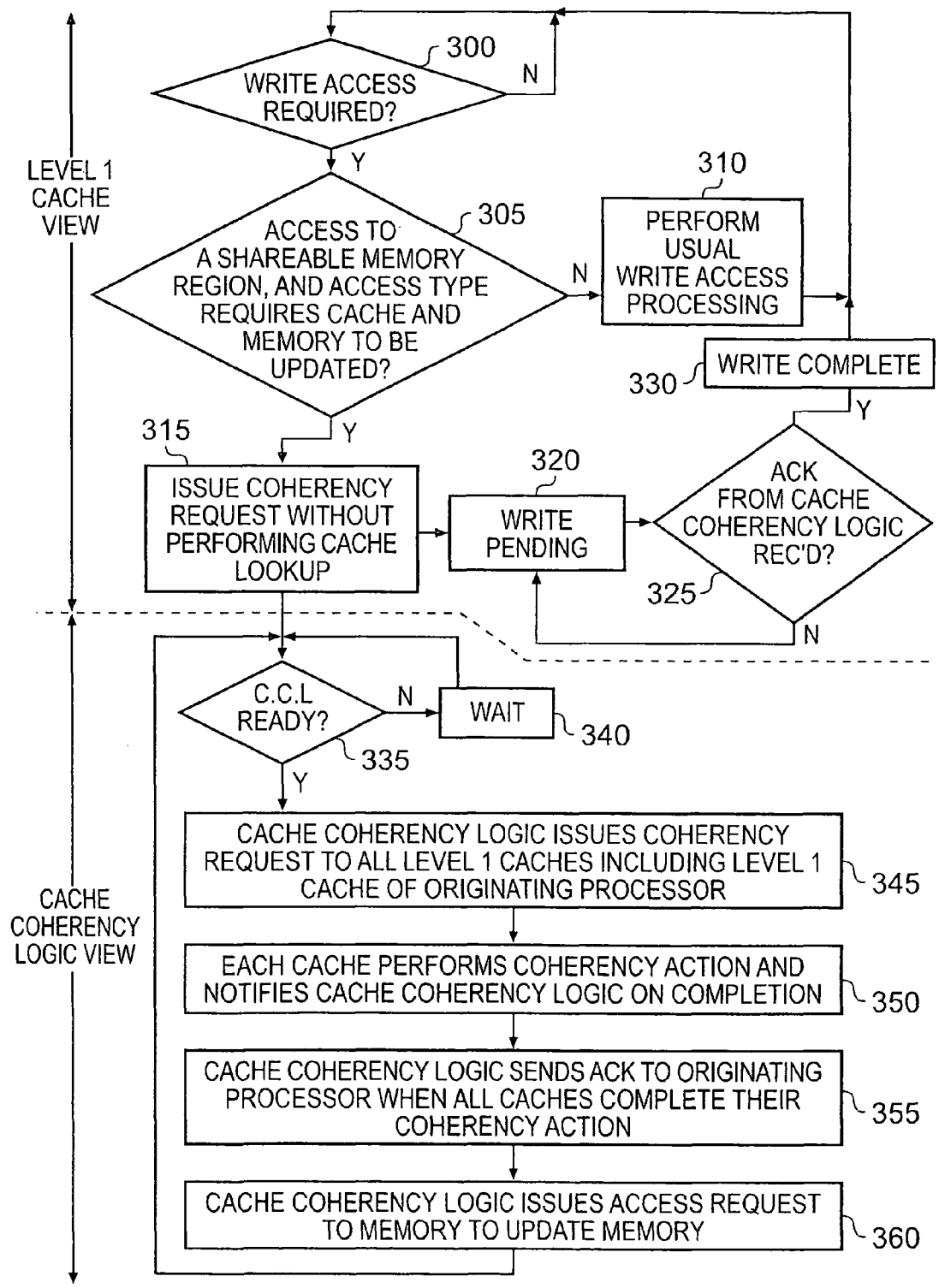
FIG. 4 is a flow diagram illustrating the processing performed in order to handle a write access request in accordance with one example embodiment.

FIG. 4 is a flow diagram illustrating the operation of the data processing apparatus 10, 100 of FIG. 1A or FIG. 1B in accordance with one embodiment when handling write access requests. Firstly, at step 300 it is determined by a data cache whether a write access is required. Accordingly, when the associated processor core issues a write access request to the data cache, this will be detected at step 300, and the process will proceed to step 305, where it is determined whether the access is to a shareable memory region, and the access type requires the cache and memory to be updated. If not, then the data cache performs its usual write access processing at step 310, whereafter the process returns to step 300. Such usual write access processing may or may not involve the issuance of a coherency request to the cache coherency logic, as will be appreciated from the earlier description of FIG. 2.

However, assuming it is determined at step 305 that the access is to a sharable memory region, and the access type does require the cache and the memory to be updated, then the process proceeds to step 315 where the cache issues a coherency request without performing any cache lookup. Thereafter, at step 320, the write is indicated as being pending, for example by setting a relevant status flag within the store buffer. Thereafter, the cache awaits at step 325 an acknowledgement from the cache coherency logic. Until that acknowledgement is received, the write access remains pending, but on receipt of the acknowledgement the write is considered completed at step 330, for example by clearing a relevant status bit in the store buffer, whereafter the process returns to step 300.

Furthermore, when the coherency request is issued at step 315, it is routed to the cache coherency logic, and at step 335 it is determined whether the cache coherency logic is ready to receive the coherency request. If not, then a delay is incurred at step 340, whereafter the process returns to step 335. Once the cache coherency logic is ready to receive the coherency request, then at step 345 the cache coherency logic issues that coherency request to all of the level one caches including the level one cache of the originating processor.

Thereafter at step 350 each cache performs the required coherency action and notifies the cache coherency logic on completion of that coherency action. At step 355, once all acknowledgements have been received, the cache coherency logic sends an acknowledgement to the originating processor which is detected at step 325 to cause the relevant write access to be marked as completed at step 330. Further, at step 360, the cache coherency logic issues the access request to the memory 60 in order to cause the relevant entry in the memory to be updated, whereafter the process returns to step 335.

It will be appreciated that whilst in one embodiment the cache coherency logic only issues the access request to memory once all the required cache maintenance operations have been performed by the data caches, in an alternative embodiment the access request to memory can be issued in parallel with the coherency actions taking place in respect of the data caches.

It should be noted that the techniques of example embodiments can be applied to systems where the relevant processing devices are not all processor cores, and indeed it is not essential that each processing device has its own dedicated cache. In particular, the cache coherency logic will be relevant whenever there is a cache within the system which is not within the natural path from the originating processing device to memory.

Figure 5:
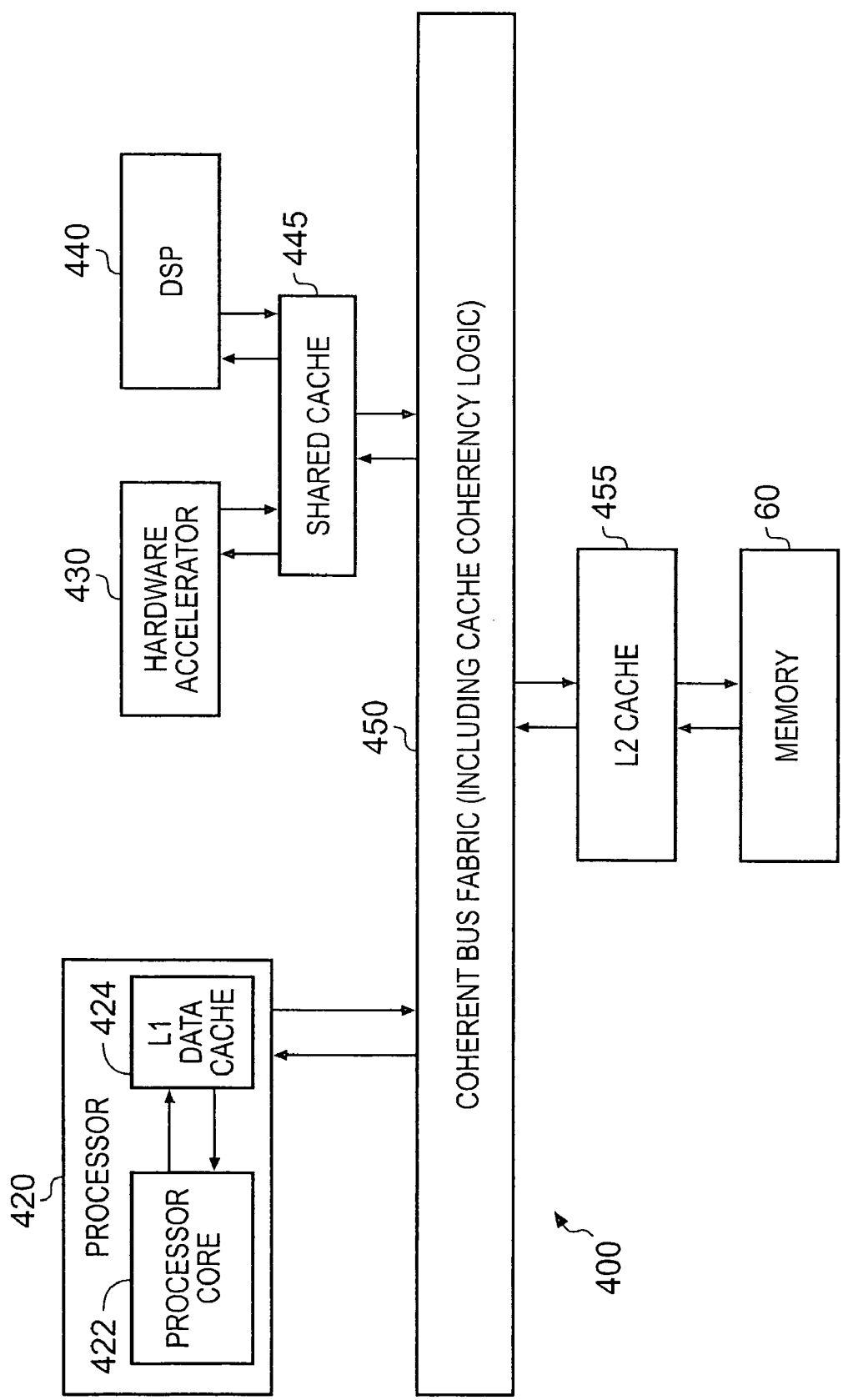
FIG. 5 is a diagram of a data processing apparatus in accordance with another example embodiment.

Hence, FIG. 5 is provided as an illustration of an alternative embodiment that may also use the above-described techniques. In this embodiment, a processor 420 comprises a processor core 422 and an associated level one data cache 424, which is coupled via coherent bus fabric 450 with a hardware accelerator 430 and a Digital Signal Processor (DSP) 440, these devices sharing a cache 445. Additionally, a coherent bus fabric 450 is coupled to memory 60 via a level two cache 455. As with the embodiment of FIG. 1A, the coherent bus fabric 450 includes cache coherency logic.

The hardware accelerator 430 may be used for a variety of purposes, and hence by way of example may take the form of a graphics engine used to perform graphics processing. The DSP 440 will typically be able to perform more varied functions than the hardware accelerator, and hence for example may used to perform voice filtering functions, to execute a graphics algorithm, etc.

The level two cache 455 can store data for access by any of the processing devices 420, 430, 440, but the shared cache 445, whilst being able to store data for the hardware accelerator 430 or the DSP 440, is not accessible by the processor 420, i.e. it is not a cache on the natural path to memory 60 from the processor 420 (i.e. the path through level one data cache 424, coherent bus fabric 450, and level two cache 455).

In such situations, the techniques of example embodiments can still be employed, and hence by way of example if the processor core 422 issues a write access request of a type that requires an update to be performed in both the level one data cache 424 and the memory 60, it can instead be routed directly out to the coherent bus fabric 450 without performing a lookup in the level one data cache 424. As a result, coherency requests will be issued by the cache coherency logic to both the level one data cache 424 and the shared cache 445, to cause required cache maintenance operations to be performed, and separately the memory update will be routed via the level two cache 455 to the memory 60.

From the above description, it will be appreciated that the above described embodiments provide a simple implementation for ensuring the correct behaviour of write accesses to shared memory which require both an update to cache and to memory, without increasing the complexity of the data cache logic. This is particularly beneficial in embodiments which may in any event choose not to support coherent write through write accesses to shared memory, but nonetheless need to have the capability to handle correctly non-cacheable shared writes, where it will typically be quite rare for there to actually be a hit in the cache, and accordingly the provision of additional circuitry within the data cache logic is considered particularly expensive.

Prior to the technology described in this application, it would be necessary in the event of a non-cacheable shared write to perform a lookup in the cache, and in the event of a cache hit to then issue a coherency request to cache coherency logic to cause all of the other caches associated with other processors in the data processing apparatus to be subjected to the required coherency operations. Thereafter, it would be necessary to update both the cache of the originating processor and the shared memory in an atomic manner, which introduces a lot of hazards and as described earlier is hence very costly and time consuming to implement.

However, by using the technology described in this application, it is not necessary to perform a lookup in the cache of the originating processor, and instead a coherency request is issued directly to the cache coherency logic, with this coherency request then being propagated to all of the processors in the system, including the processor that originated the request. If the processor originating the write access request has the data in its cache, it will respond to the coherency request by taking the appropriate action to ensure coherency (for example either updating or invalidating the corresponding cache line), but this is merely part of the standard processing that is performed by any data cache receiving a cache coherency request. Accordingly, no additional complexity is required, other than enabling the cache coherency logic to issue the coherency request to the originating processor in addition to all of the other processors that would normally receive the coherency request.

In embodiments where the cache coherency logic has advanced features to allow it to filter coherency requests, it may or may not be necessary to forward the coherency request to the processor originating the write access request, and in particular it may not be necessary to forward that request to the originating processor if the cache coherency logic knows that the data is not in the cache. When using embodiments to provide correct behaviour for handling non-cacheable shared writes, it is envisaged that in most cases there will never be a hit in the data cache, and accordingly the provision of such filter logic within the cache coherency logic can save significant power.

Although particular example embodiments have been described herein, it will be appreciated that the claims are not limited thereto and that many modifications and additions thereto may be made within the scope of the claims.

We claim:

1. A data processing apparatus, comprising:
a plurality of processing units for performing data processing operations requiring access to data in shared memory;
each processing unit having a cache associated therewith for storing a subset of said data for access by that processing unit;
cache coherency logic employing a cache coherency protocol to ensure data accessed by each processing unit is up-to-date;
each processing unit being configured to issue a write access request when outputting a data value for storing in said shared memory, wherein when the write access request is of a type requiring both the associated cache and the shared memory to be updated, the processing unit issuing the write access request is configured to treat the write access request as a write access request that does not require a cache lookup by the processing unit;
the cache coherency logic being configured, when the write access request is of a type requiring both the associated cache and the shared memory to be updated, to initiate and perform a coherency operation in respect of the caches associated with the plurality of processing units, including the cache associated with the processing unit issuing the write access request, in order to ensure that the data in those caches is kept coherent; and
the cache coherency logic further being configured to issue an update request to said shared memory in respect of the data value the subject of the write access request.

2. A data processing apparatus as claimed in claim 1, wherein when the write access request is a non-cacheable write access request to said shared memory, the coherency operation is initiated within the cache coherency logic.

3. A data processing apparatus as claimed in claim 1, wherein when the write access request is a write through write access request to said shared memory, the coherency operation is initiated within the cache coherency logic.

4. A data processing apparatus as claimed in claim 1, wherein when performing the coherency operation the cache coherency logic issues a coherency request signal to each of the caches associated with the plurality of processing units, the coherency request signal identifying an address associated with the data value the subject of the write access request.

5. A data processing apparatus as claimed in claim 1, wherein when performing the coherency operation the cache coherency logic is configured to apply a filter operation to determine which caches to issue coherency requests to, and then to issue a coherency request signal to the determined caches, the coherency request signal identifying an address associated with the data value the subject of the write access request.

6. A data processing apparatus as claimed in claim 1, wherein when the write access request is of a type requiring both the associated cache and the shared memory to be updated, the coherency operation is initiated within the cache coherency logic without a cache lookup being performed in the cache associated with the processing unit that issued that write access request.

7. A data processing apparatus as claimed in claim 1, wherein for each processing unit the cache associated therewith is a local cache associated solely with that processing unit.

8. A data processing apparatus as claimed in claim 1, wherein the shared memory is a shared memory region of a memory.

9. A data processing apparatus as claimed in claim 1, wherein at least one of the plurality of processing units is a processor core.

10. A data processing apparatus as claimed in claim 1, wherein the cache coherency protocol is a snoop-based cache coherency protocol.

11. Cache coherency circuitry for use in a data processing apparatus having a plurality of processing units for performing data processing operations requiring access to data in shared memory, each processing unit having a cache associated therewith for storing a subset of said data for access by that processing unit, the cache coherency circuitry employing a cache coherency protocol to ensure data accessed by each processing unit is up-to-date, each processing unit being configured to issue a write access request when outputting a data value for storing in said shared memory, wherein when the write access request is of a type requiring both the associated cache and the shared memory to be updated, the processing unit issuing the write access request is configured to treat the write access request as a write access request that does not require a cache lookup by the processing unit;

the cache coherency circuitry being configured, when the write access request is of a type requiring both the associated cache and the shared memory to be updated, to initiate and perform a coherency operation in respect of the caches associated with the plurality of processing units, including the cache associated with the processing unit issuing the write access request, in order to ensure that the data in those caches is kept coherent; and the cache coherency circuitry further being configured to issue an update request to said shared memory in respect of the data value the subject of the write access request.

12. A method of handling write access requests to shared memory in a data processing apparatus, the data processing apparatus comprising a plurality of processing units for performing data processing operations requiring access to data in said shared memory, each processing unit having a cache associated therewith for storing a subset of said data for access by that processing unit, the method comprising the steps of:

issuing from a processing unit a write access request when outputting a data value for storing in said shared memory;

when the write access request is of a type requiring both the associated cache and the shared memory to be updated, the processing unit issuing the write access request treating the write access request as a write access request that does not require a cache lookup by the processing unit and cache coherency logic initiating a coherency operation, the cache coherency logic employing a cache coherency protocol to ensure data accessed by each processing unit is up-to-date;

performing the coherency operation in respect of the caches associated with the plurality of processing units, including the cache associated with the processing unit issuing the write access request, in order to ensure that the data in those caches is kept coherent; and issuing an update request to said shared memory in respect of the data value the subject of the write access request.

13. A data processing apparatus, comprising:

a plurality of processing means for performing data processing operations requiring access to data in shared memory means;

each processing means having cache means associated therewith for storing a subset of said data for access by that processing means;

cache coherency means for employing a cache coherency protocol to ensure data accessed by each processing means is up-to-date;

each processing means for issuing a write access request when outputting a data value for storing in said shared memory means, wherein when the write access request is of a type requiring both the associated cache means and the shared memory means to be updated, the processing means issuing the write access request is configured to treat the write access request as a write access request that does not require a cache lookup by the processing means;

the cache coherency means, when the write access request is of a type requiring both the associated cache and the shared memory to be updated, for initiating and performing a coherency operation in respect of the cache means associated with the plurality of processing means, including the cache means associated with the processing means issuing the write access request, in order to ensure that the data in those cache means is kept coherent; and the cache coherency means further for issuing an update request to the shared memory means in respect of the data value the subject of the write access request.

* * * * *